United States Patent [19]

San Juaquin

[11] 3,924,427
[45] Dec. 9, 1975

[54] ANTI-THEFT AUTOMOBILE DOOR LOCK

[76] Inventor: Jaime E. San Juaquin, 10629 S. Vernon St., Chicago, Ill. 60628

[22] Filed: July 27, 1973

[21] Appl. No.: 383,391

[52] U.S. Cl. .................. 70/264; 70/265; 292/38; 292/171; 292/144; 296/146
[51] Int. Cl.² ........................................ E05B 65/30
[58] Field of Search ............ 70/237, 256, 257, 262, 70/264; 292/28, 38, 39, 50, 84, 125, 133, 141, 171, 225, 235, DIG. 25; 49/357, 394; 296/146

[56] References Cited
UNITED STATES PATENTS

| | | | |
|---|---|---|---|
| 595,425 | 12/1897 | Adams | 292/205 |
| 815,943 | 3/1906 | Dewhurst et al. | 292/7 |
| 1,873,653 | 8/1932 | Lyles et al. | 292/6 |
| 2,446,828 | 8/1948 | Hamer | 292/38 |
| 2,612,397 | 9/1952 | Stutt | 292/166 |

FOREIGN PATENTS OR APPLICATIONS

| | | | |
|---|---|---|---|
| 1,077,757 | 5/1954 | France | 292/141 |
| 520,973 | 1/1956 | Canada | 292/171 |
| 1,506,938 | 11/1967 | France | 292/171 |
| 996,187 | 8/1951 | France | 292/39 |

*Primary Examiner*—Albert G. Craig, Jr.
*Attorney, Agent, or Firm*—Hill, Gross, Simpson, Van Santen, Steadman, Chiara & Simpson

[57] ABSTRACT

A lock pin extends through a door frame and into a hole in the edge of a door to provide a hidden positive door lock. The lock pin is retracted by a motor mechanism, either electrically or manually powered, mounted in the trunk of the automobile. The pin may be spring biased toward a lock position, or may be thrust into such position by means of a Bowden cable. The motor may be in the form of a simple lever and Bowden cable arrangement, a hand cranked gear and pulley arrangement, or an electric motor, such as a power window motor.

6 Claims, 3 Drawing Figures

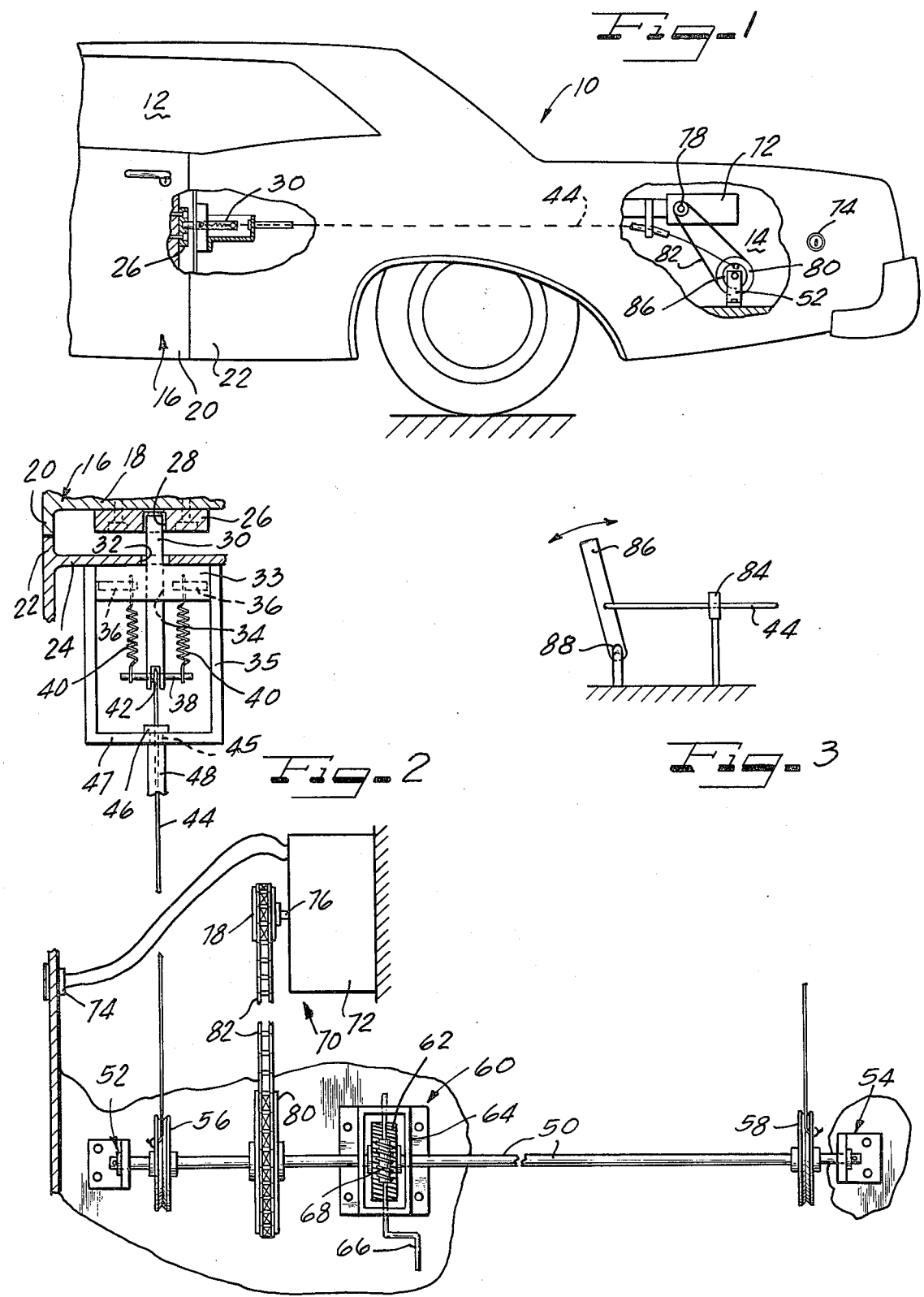

ANTI-THEFT AUTOMOBILE DOOR LOCK

BACKGROUND OF THE INVENTION

1. Field of the Invention

This invention relates to door locks and more particularly to a hidden door lock for an automobile or the like.

2. Description of the Prior Art

The prior art recognizes many forms of compartment locks for automobiles or the like. Many of these locks, however, are directed to passenger safety and lock the passenger compartment of a vehicle during occupancy.

Other vehicle locks are, however, provided to prevent unauthorized access to different compartments of a vehicle. For example, there is the well known passenger compartment door lock which operates with a key, usually the same key which is also used for the ignition system. It is well recognized that such locks offer little in the way of anti-theft protection.

Another type of compartment lock is disclosed by P. P. Bartmer in his U.S. Pat. No. 1,208,893 which is directed to a hood lock for automobiles. This lock is directed for use with vintage automobiles and employs a cable system for retracting a locking pin from a hood latch by means of a cable and pulley arrangement.

SUMMARY OF THE INVENTION

It is the primary object of the present invention to provide a new and improved passenger compartment anti-theft door lock.

Another object of the invention is to provide a hidden anti-theft door lock which provide a positively set, dead bolt type locking function.

Another object of the invention is to provide a hidden anti-theft door lock for an automobile in which the controlling mechanism for the lock is remotely located with respect thereto.

Another object of the invention is to provide an anti-theft door lock which is simple to construct, easy to install and economically manufactured.

An anti-theft door lock, according to the present invention, comprises a spring-loaded lock pin mounted in a door frame and urged by a bias spring or springs toward the associated door. The door includes a hole in the edge thereof, or a plate having such a hole affixed thereto, for receiving the lock pin. For two-door vehicles, the lock would most advantageously be mounted opposite the door hinges; while on four-door automobiles the rear door locks may be similarly mounted and the front door locks mounted in the same fashion or along another unhinged edge of the doors. In any case, the door lock must be mounted along an unhinged edge of a door, preferably as remote from the hinges as possible.

A mechanism for operating the lock is located in another, lockable compartment of the automobile, such as the trunk. This mechanism is connected to the lock by means of a flexible cable, such as a Bowden cable. The lock pin is inserted and retracted via the cable. A simple lever connected to a Bowden cable will suffice for retracting the pin and thrusting it to a lock position, particularly when the pin is spring loaded toward the lock position. The pin may also be withdrawn by taking up the cable on a pulley under the control of a hand operated motor or an electric motor.

BRIEF DESCRIPTION OF THE DRAWING

Other objects, features and advantages of the invention, its organization, construction and operation will be best understood from the following detailed description of preferred embodiments thereof taken in conjunction with the accompanying drawing, on which:

FIG. 1 is an elevational view of a part of a vehicle showing the installation of a door lock constructed in accordance with the principles of the present invention;

FIG. 2 is a top view of the lock apparatus of FIG. 1 showing only those associated parts of the vehicle as are necessary for understanding the present invention; and FIG. 3 is a schematic representation of a lever and Bowden cable arrangement for operating the lock illustrated in FIGS. 1 and 2.

DESCRIPTION OF THE PREFERRED EMBODIMENTS

Referring to FIG. 1, a vehicle is generally illustrated at 10 as comprising a passenger compartment 12 and a lockable second compartment 14, here the trunk of the vehicle. The particular vehicle illustrated is a two-door model having a door 16. As can be seen in FIG. 1, the door lock of the present invention is mounted opposite the door hinges (not shown) and functions to deny access to the passenger compartment of the vehicle. The mechanism for operating the lock is remotely mounted in the trunk 14.

Referring now also to FIG. 2, the door lock is illustrated as comprising a plate 26 mounted on the door edge 18 and including a hole 28. On OEM equipment, the hole 28 could advantageously be provided in the door edge 18, with or without a backing plate, depending on whether the door 18 had sufficient wall thickness.

A door frame 24 includes a hole 32 for receiving a lock pin 30 therethrough. The lock pin 30, of course, is extensible into the hole 28 of the plate 26. The pin 30 is carried within a suitable frame 35 which may include a forward plate 33 having a hole 34 for receiving the pin 30 therethrough. The pin 30 is spring loaded so as to be biased toward the hole 28 by a pair of springs 40 which are connected between a pin or pins 38 extending from the pin 30 and a pair of pins 36 which extend from the frame 35, or which are formed by machine screws located in opposed threaded bores in the forward plate 33. In either case, the pins extend from and are a part of the frame 35.

The lock pin 30 includes a slot 42 therein by means of which a Bowden cable 44 or the like may be attached thereto, herein common with the springs 40 by the pin 38. For this purpose, the end of the cable is fitted with an eye or the like. The cable 44 extends through a hole 45 in the rear plate 47 of the frame 35 and the outer sleeve of the Bowden cable is attached to the frame at 46. A guide, in the form of a tube 48 may be provided, particularly during original vehicle manufacture, for threading the cable between the door and the trunk.

A shaft 50 is mounted for rotation in the trunk 14 by means of a pair of bearings 52, 54. Inasmuch as a two-door vehicle has been illustrated, the shaft 50 is provided with a pair of pulleys 56, 58 for respective door locks.

A manually operated motor 60 may be provided for winding the cable 44 about the pulley 56 to retract the pin 30 and withdraw the same from the hole 28. The motor 60 comprises a gear 62 carried on the shaft 50, a frame 64 through which the shaft 50 extends and which rotatably carries a crank 66. The crank 66 carries a worm gear 68 which is meshed in driving engagement with the gear 62 so that turning of the crank 66 causes rotation of the shaft 50.

The shaft 50 may also be rotated by an electric driving mechanism 70 which includes a motor 72, such as a power window motor, having an output shaft 76. The shaft 76 carries a sprocket 78 which is connected in driving engagement with a sprocket 80 carried by the shaft 50 by means of a chain 82. The motor 72 may be controlled for operation in either direction by means of a key-operated switch 74, such as is employed with automobile burglar alarm systems.

Referring to FIG. 3, another apparatus is illustrated for operating the door lock. In FIG. 3, the outer sleeve of the Bowden cable is anchored within the trunk at 84 and connected to a lever 86 which is pivotally mounted at 88. Pivoting of the lever 86 in the counterclockwise direction will withdraw the pin 30, while pivoting of the lever 86 in the clockwise direction will cause the pin to be inserted into the hole 28. The bias springs 40 may not be necessary with such an arrangement; however, such springs will, of course, aid in inserting lock pin.

Attention is invited that an automobile body is generally provided with flanges 20, 22 where a door and the adjacent body panels meet. This construction is advantageous in providing a hidden door lock. Without knowledge that a door lock such as that provided by the present invention is utilized on a vehicle, and upon being unable to open the automobile door when the conventional door lock is forced for entry, it is anticipated that the potential thief will become discouraged and leave. The present invention may, however, be utilized most advantageously in conjunction with an automobile burglar system in order to thwart any attempt to discover and release the anti-theft door lock.

Although I have described my invention by reference to specific illustrative embodiments thereof, many changes and modifications of the invention may become apparent to those skilled in the art without departing from the spirit and scope of the invention. I therefore intend to include within the patent warranted hereon all such changes and modifications as may reasonably and properly be included within the scope of my contribution to the art.

I claim:

1. An anti-theft lock installed in a vehicle, comprising:
   a passenger compartment including a door frame and a hinged door closing said frame;
   a lockable trunk compartment;
   means defining a hole in an unhinged edge of said door, said means including a plate fixed to said door and having the hole therein;
   pin means mounted in said door frame opposite the hole including a movable lock pin for entry into and withdrawal from the hole; and
   pin operating means including motor means mounted and concealed in said trunk compartment and connecting means connecting said motor means to said lock pin;
   said connecting means including
      a shaft mounted in said trunk compartment and rotatable in both directions, said shaft connected to said motor means,
      a pulley mounted on said shaft for rotation therewith, and
      a cable having one end connected to said lock pin and the other end connected to said pulley, and
   said pin means further including
      a frame connected to said door frame,
      at least one second pin extending from said frame,
      at least one third pin extending from said lock pin, and
      biasing means for biasing said lock pin toward the hole in said plate, said biasing means including a spring connecting said second and third pins.

2. The combination of claim 1, wherein said motor means includes an electric motor for connection to the electrical supply of the vehicle.

3. The combination of claim 1, wherein said motor means includes a manually operated device.

4. The combination of claim 1, wherein said motor means comprises a pivotal lever, and said connecting means includes a Bowden cable connected between said lock pin and said lever.

5. The combination of claim 1, wherein said connecting means includes a rotatable shaft, and said motor means includes a first gear carried on said shaft, a rotatable second gear meshed with said first gear, and a hand-operated crank connected to rotate said second gear.

6. The combination of claim 1, wherein motor means includes a rotatable output shaft, said connecting means includes a rotatable second shaft first and second sprockets carried on said output and second shafts, respectively, and a chain trained about said sprockets.

* * * * *